United States Patent [19]
Suda

[11] Patent Number: 4,959,185
[45] Date of Patent: Sep. 25, 1990

[54] PROCESS FOR PRODUCING ACOUSTIC CARBON DIAPHRAGM

[75] Inventor: Yoshihisa Suda, Maebashi, Japan

[73] Assignee: Mitsubishi Pencil Co., Ltd., Tokyo, Japan

[21] Appl. No.: 239,268

[22] Filed: Sep. 1, 1988

[51] Int. Cl.[5] .......... B29C 41/02; C01B 31/02
[52] U.S. Cl. .......... 264/81; 264/85; 264/317; 423/449; 427/249
[58] Field of Search .......... 264/29.1, 29.5, 29.6, 264/29.7, 81, 139, 317, 85; 423/449; 427/249

[56] References Cited

U.S. PATENT DOCUMENTS

| | | | |
|---|---|---|---|
| 3,271,488 | 9/1966 | Dahlberg | 264/81 |
| 3,457,042 | 7/1969 | Ettinger | 423/449 |
| 3,949,106 | 4/1976 | Araki et al. | 427/249 |
| 4,034,031 | 7/1977 | Lersmacher et al. | 264/29.1 X |
| 4,035,460 | 7/1977 | Dietze et al. | 264/81 |
| 4,332,751 | 6/1982 | Brassell et al. | 264/29.1 X |
| 4,349,498 | 9/1982 | Ellis et al. | 264/81 |

FOREIGN PATENT DOCUMENTS

| | | | |
|---|---|---|---|
| 53-106025 | 9/1978 | Japan | 264/29.5 |
| 58-136764 | 8/1983 | Japan | 264/317 |

OTHER PUBLICATIONS

English-Language Translation of Japanese (Kokai) Reference 53-106,025.

*Primary Examiner*—Jeffery Thurlow
*Assistant Examiner*—Leo B. Tentoni
*Attorney, Agent, or Firm*—Oliff & Berridge

[57] ABSTRACT

A process for producing an acoustic diaphragm of carbonaceous material including the steps of uniformly depositing vapor phase thermally decomposed carbon generated by the thermal decomposition of a carbon-generating material introduced together with a carrier gas on the surface of a diaphragm-shaped base material and separating the obtained thermally decomposed carbon deposit from the diaphragm-shaped base material. Thus, the diaphragm is inexpensively made of a carbon material having a large E/ρ value, high elasticity and high accuracy, without cracking.

4 Claims, No Drawings

PROCESS FOR PRODUCING ACOUSTIC CARBON DIAPHRAGM

BACKGROUND OF THE INVENTION

The present invention relates to a process for producing an acoustic diaphragm made of carbonaceous material. More particularly, the invention relates to a process for producing an acoustic diaphragm adapted for digital audio use and formed of carbonaceous material having light weight, high elasticity, fast sound transmission velocity, excellent rigidity, less deformation when subjected to external force, small distortion of sound, wide reproducing sound range and distinct sound quality, as compared with conventional diaphragm materials used for speakers and microphones.

It is generally desired that a diaphragm for a speaker and a voice coil bobbin satisfy the following conditions:

(1) small density, (2) large Young's modulus, (3) large propagating velocity of longitudinal waves, (4) adequately large internal loss of vibration, (5) stability against variation in atmospheric conditions, and (6) no deformation or change of properties.

More specifically, the material for the diaphragm is required to have a wide reproducing sound range in high fidelity over a broad frequency band. To efficiently and distinctly produce such sound quality, the material should have high rigidity, no distortion (such as creep) when subjected to external stress, as well as a large sound propagating velocity. In order to further increase the sound velocity (calculated from the equation of $$V=(E/\rho)^{\frac{1}{2}}$$

where V is sound velocity, E is Young's modulus, $\rho$ is density), material of low density and high Young's modulus is desirably employed.

The materials previously used include paper (pulp) and plastic as basic materials, and further contain glass fiber, carbon fiber, or processed aluminum, titanium, magnesium, beryllium, boron, metal alloy, metal nitride, metal carbide, or metal boride. However, paper, plastic, and their composite materials have small Young's modulus and small density. Thus, the sound velocities of these materials are low. The frequency characteristics in the high frequency band of the material are particularly low, so that vibration division occurs so as to give a differential vibration in part with an entire vibration of frequency band in excess of a specific mode of the frequency, resulting in difficulty in producing distinct sound quality. In addition, these materials are adversely affected by external environments such as temperature and moisture, causing deterioration in sound quality and aging fatigue. On the other hand, when metal plates of aluminum, magnesium or titanium are employed, the sound velocities of the materials are faster than paper or plastic, but since these materials have small $E/\rho$ value and small internal loss of vibration values, these materials exhibit sharp resonance in high frequency bands and aging fatigue (such as creep) occurs. Beryllium and boron provide excellent physical properties. The use of such materials as diaphragms in squawkers or tweeters extends the limits of audible frequency bands which can be reproduced, so that natural sound quality is correctly produced without transient phenomena caused by signals in the audible band. However, these materials are less available as resources, are very expensive, and are difficult to machine. It is difficult to produce speakers of large size by these processes.

In addition to these materials, there have been attempts to obtain diaphragms made of carbonaceous material having large $E/\rho$ values. These attempts include: (1) a method for carbonizing a resin sheet or film into solely graphite, (2) a method for shaping and carbonizing a composite material of resin and various carbonaceous powder into graphite, and (3) a method for carbonizing carbon fiber-reinforced plastic into graphite.

Since method (1) has a small carbon yield, a precise product is difficult to obtain and a product having high Young's modulus (like graphite or carbon fiber) cannot be obtained.

Method (2) can be used to obtain a product having high Young's modulus as compared with method (1) by using graphite or carbon fiber, but since method (2) uses various resins so as to improve moldability, the ratio of the carbon derived from the resin to the calcined powder is large, such that the Young's modulus of the carbon fiber or graphite is lower.

Since only the plastic portion is baked and contracted in method (3) when the carbon fiber-reinforced plastic is calcined, numerous fine cracks occur among carbon fibers so that a product in which the carbon fiber and the carbon derived from the resin are integrated without defects cannot be obtained. Therefore, it has a drawback in that the function of the carbon fiber is lost.

SUMMARY OF THE INVENTION

Accordingly, an object of the present invention is to provide an inexpensive industrial process for producing an acoustic carbon diaphragm of carbonaceous material, which eliminates the above-described drawbacks of conventional diaphragms and which is made of a carbon material having a large $E/\rho$ value with carbon material having high elasticity, facilitating high accuracy in shaping without cracking.

According to the present invention, a process for producing an acoustic carbon diaphragm of carbonaceous material comprises the steps of uniformly depositing by a vapor phase technique thermally decomposed carbon generated by the thermal decomposition of a carbon-generating material introduced together with carrier gas on the surface layer of a diaphragm-shaped base material and separating the obtained thermally decomposed carbon deposit from the diaphragm-shaped base material. The diaphragm according to the present invention accurately maintains its initial size and shape during molding since complicated steps are avoided.

Since the diaphragm obtained by the process of the present invention traces the shape of the base material, the accuracy of the size and the shape of the diaphragm is highly maintained, and the diaphragm has high elasticity, high velocity, light weight and less distortion.

A process for producing an acoustic carbon diaphragm according to the present invention will now be described.

A base material of diaphragm shape obtained by processing metal, such as iron or copper, and cutting a graphite block is first heated by an induction heating system using a high frequency induction furnace or a heating system using a lateral tubular furnace. A carbon-generating material is introduced together with carrier gas, such as argon, in contact with the heated base material to thermally decompose and deposit the carbon-generating material.

As the carbon-generating material, methane, propane, benzene, acetylene, ethane chloride and ethylene dichloride may be used. When ethylene chloride, such as 1,1-dichloroethylene, cis-1,2-dichloroethylene, trans-1,2-dichloroethylene, 1,1,2-trichloroethylene, and ethane chloride, such as 1,1-dichloroethane, 1,2-dichloroethane, 1,1,1-trichloroethane, 1,1,2-trichloroethane, to be thermally decomposed at low temperature are used, thermally decomposed carbon at 1100° C. and most preferably 900° C. is obtained, thereby improving the productivity.

It is important that the decomposed carbon being deposited and the surface layer be maintained at approximately equal temperatures to avoid a large temperature gradient. The thermally decomposed carbon obtained by thermal decomposition of the carbon-generating material introduced together with the carrier gas can be uniformly deposited on the surface layer.

Here, the hydrocarbon concentration in the carrier gas depends upon the temperature of the base material, the gas pressure and velocity, 20 vol. % being preferred. The higher the temperature of the base material, the lower the concentration of the carbon-generating material needs to be. The concentration is enhanced if the gas pressure in a vessel for producing the thermally decomposed carbon is lower. Thus, the higher the gas flow velocity is, the greater the concentration can be. In order to accelerate the depositing velocity, the concentration may be increased. In order to enhance the carbon yield, the gas flow rate can be reduced. The thermally decomposed carbon can be obtained at a maximum depositing velocity of several mm/hour.

The elasticity value of the general carbon material is 0.5 to $1.5\times10^6$ g/mm$^2$, the elasticity value of the hard carbon material, such as glassy carbon obtained by the carbonization of thermosetting resin, is 2.0 to $3.3\times10^6$ g/mm$^2$, and the elasticity of the thermally decomposed carbon is lower than 3.0 to $6.0\times10^6$ g/mm$^2$. Therefore, according to the present invention, a diaphragm of higher elasticity than that obtained by molding and carbonizing the resin can be obtained.

Then, the deposit of the thermally decomposed carbon is separated from the base material. The separation is executed by cooling or by reheating and recooling, utilizing the difference in thermal expansion coefficient of the base material and the thermally decomposed carbon to facilitate separation, or by cutting and removing the base material In the case of metal base material, the separation is executed by dissolving with a solvent or by melting at high temperatures. In this manner, a diaphragm made only of the thermally decomposed carbon can be obtained. The obtained diaphragm can accurately trace the shape and the size of the base material.

The obtained diaphragm may be graphitized if required.

DESCRIPTION OF THE PREFERRED EMBODIMENTS

The present invention will be described by examples of processes for producing an acoustic diaphragm, but the present invention is not limited to these particular examples.

Example 1

An artificial graphite block was cut to obtain a base material of diaphragm shape.

Then, this base material was heated by an induction heating system using a high frequency induction furnace, and a thermally decomposed carbon was deposited on the surface of the base material. The material used was cis-1,2-dichloroethylene, together with argon as carrier gas. The material concentration was 13 vol. %, the gas flow rate was 380 ml/min., the base material temperature was held at 880° C., and the thermally decomposed carbon was deposited for 0.3 hour. The obtained graphite and the thermally decomposed carbon were integrated, quickly cooled, quickly heated, and the thermally decomposed carbon was separated from the base material. At this time, since a small amount of graphite powder was adhered to the thermally decomposed carbon, it was cut and removed.

The obtained diaphragm was 40 microns thick and precisely traced the shape and the size of the base material.

A flat test piece having the same thickness as the obtained diaphragm was produced under the same conditions as this diaphragm and various properties were measured. The density was 2.0 g/cm$^3$, the elasticity was 52 GPa, and the sonic velocity was 5100 m/sec.

Example 2

A block made of graphite-silica-alumina was cut to obtain a base material of diaphragm shape.

Then, this base material was heated by an external heating system using a lateral tubular furnace and a thermally decomposed carbon was deposited on the surface layer of the base material. The material used was propane, together with argon as carrier gas. The material concentration was 16 vol. %, the gas flow rate was 420 ml/min., the base material temperature was held at 1200° C., and the thermally decomposed carbon was deposited for 0.3 hour. The obtained graphite and the thermally decomposed carbon were integrated, quickly cooled, quickly heated, and the thermally decomposed carbon was separated from the base material. The obtained material was heated to 2200° C. in a nitrogen gas atmosphere. The diaphragm thus obtained was 60 microns thick and accurately traced the shape and the size of the base material.

A flat test piece having the same thickness as the obtained diaphragm was produced under the same conditions as this diaphragm and various properties were measured. The density was 2.1 g/cm$^3$, the elasticity was 63 GPa, and the sonic velocity was 5480 m/sec.

What is claimed is:

1. A process for producing an acoustic diaphragm of carbonaceous material, comprising the steps of:

uniformly depositing by a vapor phase technique thermally decomposed carbon generated by thermal decomposition of a carbon-generating material introduced together with a carrier gas on a surface layer of a diaphragm-shaped base material, and separating the obtained thermally decomposed carbon deposit from the diaphragm-shaped base material, said carbon-generating material being selected from the group consisting of benzene, ethylene chloride and ethane chloride.

2. The process according to claim 1, wherein said carbon-generating material is selected from the group consisting of 1,1-dichloroethylene, cis-1,2-dichloroethylene, trans-1,2-dichloroethylene, 1,1,2-trichloroethylene, 1,1-dichloroethane, 1,2-dichloroethane, 1,1,1-trichloroethane and 1,1,2-trichloroethane.

3. The process according to claim 1, wherein said carrier gas is an inert gas.

4. The process according to claim 1, wherein said carrier gas is selected from the group consisting of hydrogen, nitrogen and argon.

* * * * *